United States Patent [19]

Nakashima et al.

[11] Patent Number: 4,835,362

[45] Date of Patent: May 30, 1989

[54] SYSTEM FOR CONVERTING WELDING CONDITIONS OF WELDING ROBOT

[75] Inventors: Seiichiro Nakashima; Kenichi Toyoda, both of Hino; Nobutoshi Torii, Hachiouji, all of Japan

[73] Assignee: Fanuc Ltd, Minamitsuru, Japan

[21] Appl. No.: 153,556

[22] Filed: Feb. 3, 1988

Related U.S. Application Data

[63] Continuation of Ser. No. 776,204, Sep. 4, 1985, abandoned.

[30] Foreign Application Priority Data

Jan. 31, 1984 [JP] Japan .................................. 59-15564

[51] Int. Cl.⁴ ............................................... B23K 9/10
[52] U.S. Cl. ............................... 219/130.1; 219/125.1; 901/42
[58] Field of Search ............. 219/125.1, 124.34, 130.5, 219/130.31, 130.32, 130.33, 130.21; 901/42; 364/477

[56] References Cited

U.S. PATENT DOCUMENTS

4,390,954 6/1983 Manning .......................... 219/130.5

FOREIGN PATENT DOCUMENTS

57-9583  1/1982  Japan .
57-75287 5/1982 Japan .

OTHER PUBLICATIONS

Japanese Abstract 57-9583 (A)–Current and Voltage Command System for Automatic Welding Robot, 1/1982.
Japanese Abstract 57-75288 (A)–Arc Welding Method, 5/1982.

*Primary Examiner*—Clifford C. Shaw
*Attorney, Agent, or Firm*—Staas & Halsey

[57] ABSTRACT

A system for converting the welding conditions of a welding robot includes a numerical control unit, which is for controlling the welding robot (8) and a welding machine (7). A memory (3) is included for storing a calculation sequence of a general expression of a given straight line obtained from an X value of a point (U=0) on the given straight line and the slope of the given straight line on a plane in which a welding condition input value is plotted along the X axis and a command value delivered to a digital/analog converter that applies commands to the welding machine is plotted along the Y axis. A value is obtained by substituting a welding condition input value, which is applied when the welding robot is taught, into the general expression stored in the memory (3), the value obtained being adapted as an output value supplied to the digital/analog converter.

4 Claims, 2 Drawing Sheets

SYSTEM FOR CONVERTING WELDING CONDITIONS OF WELDING ROBOT

This is a continuation of co-pending application Ser. No. 776,204 filed on Sept. 4, 1985 now abandoned.

BACKGROUND OF THE INVENTION

1. Field of the Invention

This invention relates to a welding robot and, more specifically, to a system for converting welding conditions for a welding robot controlled by a numerical control unit and a welding machine controlled by the numerical control unit and equipped with a torch grasped by the robot. More particularly, the invention relates to a system for converting welding voltage and welding current.

2. Description of the Related Art

Arc welding wherein an electric arc is continuously generated and the heat thereof utilized to join two metals has long been known. Recently, with the advancement of numerically controlled robots, welding robots in which such a welding operation is performed by the robot have come into practical use. Specifically, a welding robot is adapted to grasp the torch of a welding machine, move a hand of the robot in response to a command from a numerical control unit to move the torch along a welding path and perform a welding operation while the welding state is controlled by the numerical control unit. Before starting welding with a welding robot of this kind, the operator performs a so-called teaching operation in which the welding robot is actuated manually to move the torch along a welding path, during which time the numerical control unit memorizes the path. Then, such welding conditions as the commanded value of welding voltage, the commanded value of welding current, the commanded value of preflow time and the commanded value of postflow time are fed into the numerical control unit from an operator's panel and set in or loaded into the numerical control unit.

In the conventional welding robot of the above-described type, the welding voltage and welding current commands that the welding machine receives from the numerical control unit are digital command values produced by the numerical control unit and converted into analog values by a digital/analog converter (hereinafter referred to as a D/A converter). These analog values are applied to the welding machine. FIG. 1 is a view showing how the input signal to the D/A converter is related to welding voltage applied as a welding condition input value to the numerical control unit (NC). For example, when a commanded welding value representing 50 volts is to be input to the D/A converter to produce an analog value representing the 50 volts, the graph converts the command value into a digital representation of 100 and the D/A converter then converts the 100 into an output voltage of 5 volts. The welding voltage applied to the numerical control unit (NC) is plotted along the horizontal axis, and the input to the D/A converter is plotted along the vertical axis. Ordinarily, the horizontal axis is divided into a scale of from 1 to 100 and the maximum value of welding voltage taken along the vertical axis is 200 V, which is determined by the three-phase commercial supply voltage used. If the digital commanded value applied to the numerical control unit (NC) ranges from, say, 0 to 200 V, the relationship of the digital commanded value applied to the D/A converter input is 1:1, so that if 100 V is specified by the numerical control unit (NC), a 100 V output is delivered to the D/A converter. In other words, PARAMETER ANOC1=200/V (D/A converter input value)

from which we have

PARAMETER ANOC1=200/200=1 so that the input signal to the D/A converter has a 1:1 relationship with respect to the commanded value applied to the numerical control unit.

If the digital commanded value applied to the numerical control unit ranges from, say, 0 to 50 V, we have

PARAMETER ANOC1=200/50=4

Thus, the parameter is an integer.

However, if the commanded value applied to the numerical control unit ranges from, e.g., 0 to 60 V, the parameter ANOC1 is not an integer and the conversion process is very troublesome.

In addition, as shown in FIG. 1 by the dashed line, the digital/analog conversion characteristic cannot be provided with an offset characteristic.

SUMMARY OF THE INVENTION

The present invention seeks to solve the abovementioned problems encountered in the prior art and has an object of providing a system for converting the welding conditions of a welding robot, in which a welding condition input value applied to the processor of a numerical control unit for controlling a welding robot and a welding machine can be converted smoothly and accurately and then applied as a command value to a digital/analog converter for applying commands to the welding machine.

According to the present invention, there is provided a system for converting the welding conditions of a welding robot controlled by a numerical control unit and a welding machine controlled by the numerical control unit and equipped with a torch grasped by the robot. The numerical control unit includes a processor for processing welding condition input values applied thereto and for producing an output of the results of processing, a digital/analog converter for converting a digital value produced as an output by the processor and for applying it as a command to the welding machine, and a memory for storing a calculation sequence for a general expression of a given straight line obtained from an X value of a point (Y=0) on the given straight line and the slope of the given straight line on a plane in which the welding condition input value is plotted along the X axis and an output value delivered to the digital/analog converter is plotted along the Y axis. A value is obtained by substituting a welding condition input value, which is applied to the processor when the robot is taught, into the general expression stored in the memory, the processor using the value obtained as an output value to the digital/analog converter.

According to the present invention, the numerical control unit is adapted to specify, by means of the general expression, the relationship between a digital welding condition input value and a digital command value applied to the digital/analog converter that applies analog voltage commands to the welding machine. Therefore, irrespective of the employed range of welding condition input values, the input to the digital/analog converter can be implemented smoothly and accurately. In addition, a welding condition input value applied to the numerical control unit can be provided with an offset in a simple manner.

DESCRIPTION OF THE PREFERRED EMBODIMENT

Figure 2:
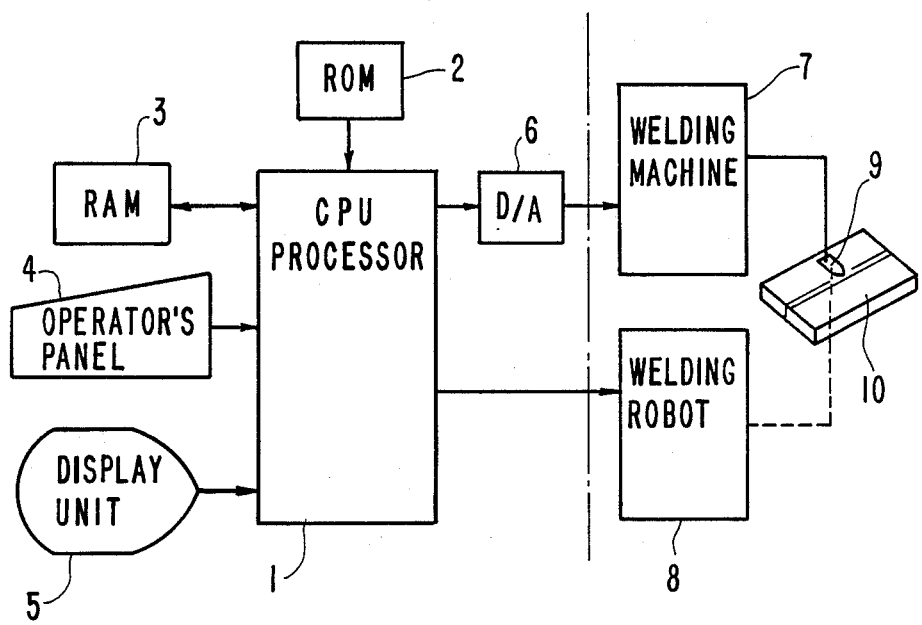
FIG. 2 is a block diagram illustrating an embodiment of a welding robot control system for practicing the present invention.

The present invention will now be described in detail based on an embodiment illustrated in FIGS. 2 through 4. FIG. 2 is a block diagram illustrating an embodiment of a welding robot control system for practicing the present invention. In the Figure, the side to the right of the one-dot chain line depicts a robot 8 and a welding machine 7, and the side to the left of the one-dot chain line shows a numerical control unit 1-6 for controlling the robot 8 and the welding machine 7.

In FIG. 2, numeral 1 denotes a processor (CPU) for controlling the overall numerical control unit and for performing processing in accordance with the instructions in a program, described below. Numeral 2 denotes a memory comprising a read-only memory (ROM) for storing a control program which controls the numerical control unit, a program for processing, described below, and the like. Numeral 3 denotes a memory comprising a random-access memory (RAM) for temporarily storing various data such as data taught to the robot 8 and welding conditions. Numeral 4 denotes an operator's panel having numeric keys, function keys, character keys and the like used for teaching robot and welding motions and for feeding the robot 8 manually as well as for entering various welding conditions. Numeral 5 designates a display unit for displaying present torch position, a program list and data. Numeral 6 denotes a digital/analog converter (D/A converter) for converting a digital command value received from the processor 1 into an analog command value and for delivering the latter to a welding machine 7. Numeral 8 represents a welding robot having a hand grasping a welding torch 9 of the welding machine 7. A welding operation is performed while the torch is moved on materials 10 in accordance with taught data.

The motions of the welding robot will now be described. First, the operator places the robot in a manual operating mode and, using the operator's panel 4, causes position information to be stored in the RAM 3 while bringing the tip of a wire projecting from the end of the torch 9 to teach points at the welding location as the hand of the welding robot 8 is moved along a predetermined path. During this teaching operation, the operator naturally teaches the proper attitude of the torch 9, which is based on the welding position, at the same time. This operation is exactly the same as an ordinary robot teaching operation and need not be described here.

Next, using the operator's panel 4, the operator inputs the contents of a series of activities, such as arc generation on/off, welding current, welding voltage, welding velocity and the job management method, thereby registering welding instructions. This ends the entire teaching operation via the numerical control unit. During the performance of the teaching operation, the display unit 5 displays the present position of the torch 9, welding conditions and the like. The method of setting welding current and welding voltage will be described in detail later.

When the welding robot 8 is started following the completion of the teaching operation, the CPU 1, based on the control program stored in ROM 2, performs welding robot control processing by reading, one block at a time, robot command data and welding command data stored in the RAM 3.

The method for setting welding voltage and welding current will now be described.

Figure 1:
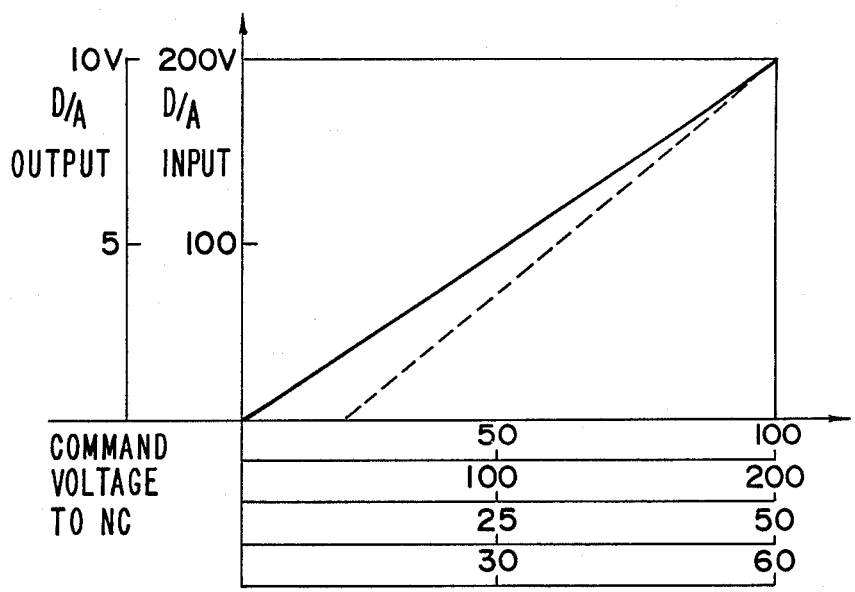
FIG. 1 is a view showing how an input signal to a digital/analog converter (D/A) is related to welding voltage applied as a welding condition input value to a numerical control unit.
Figure 3:
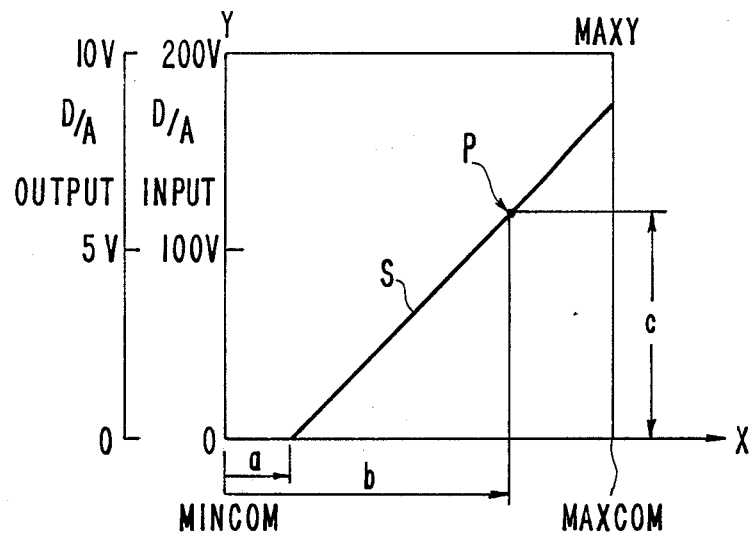
FIG. 3 is a characteristic diagram showing how an input signal to a digital/analog converter (D/A) is related to a range of welding voltages for one operating condition of a welding robot according to the present invention.
Figure 4:
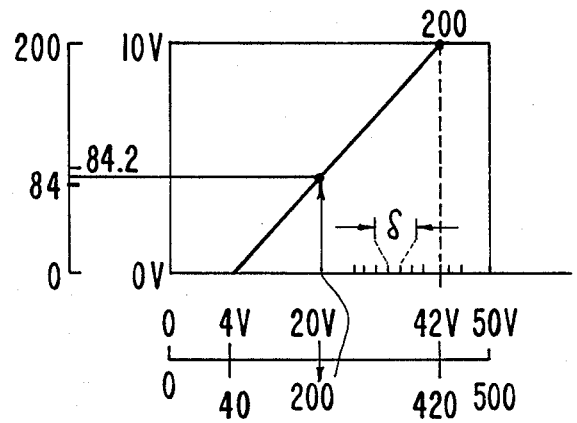
FIG. 4 is a view showing an actual example of an input value setting and welding voltage conversion operation.

FIG. 3 is a characteristic diagram showing how an input signal to the D/A converter 6 is related to a range of welding voltages for one operating condition of a welding robot according to the present invention. Please refer to the discussion of FIG. 1 for the meanings and relationship of the various scales of FIG. 3. A digital welding voltage applied to the numerical control unit is plotted along the horizontal axis X, and the input to the D/A converter 6 is plotted along the vertical axis Y. A characteristic curve of this kind is peculiar to the particular welding machine and is provided by the manufacturer of the welding machine. Note that the analog output of the D/A converter 6 has a maximum value of 10 V, which has been made to correspond to the maximum welding voltage, i.e., 200 V, of the welding machine.

In FIG. 3, the 0 point on the X axis is designated MINCOM and the maximum point MAXCOM. The point at which a straight line S intersects the X axis is designated a, and an arbitrary point on the straight line S is represented by P. Let b represent the X coordinate value of the point P, and let c represent the Y coordinate value thereof. Accordingly, we have $$\min(\text{MINCOM}) \leq \text{MINCOM} < \text{MAXCOM} \leq \max(\text{MAXCOM}) \quad (1)$$

and we let the following be true:

$$A = \text{MINCOM} + a \quad (2)$$

$$B = \text{MINCOM} + b \quad (3)$$

Then, from the slope of the straight line S, we obtain:

$$x = [y \times (B-A)/c] + A$$

$$y = c \times (x-A)/(B-A) \quad (4)$$

where MINCOM<a, b<MAXCOM

0<c<10.00

0<y<10.00

When y<0 in Eq. (4), we shall assume that y=0 is true. When y≧MAXY, we shall assume that y=MAXY.

A partitioning command unit value δ along the X axis is expressed as follows:

$$\delta = (MAXCOM - MINCOM)/(DIGZP11 \times DIV) \quad (5)$$

where DIGZP11 is a decimal number [1 or 10 or 100 or 1000] that will make the decimal point position of a three-digit input value "1", and DIV stands for the number of divisions between MAXCOM and MINCOM. An example of a partitioning unit value is illustrated in FIG. 4. This unit is the value of the increment between values on, for example in FIG. 4, the welding voltage command scale and must be determined to provide a proper conversion from commanded welding value to D/A input/output.

The foregoing expressions (1) through (5), the conditions of these expressions and their calculation sequence are all stored in the ROM 2 of the numerical control unit for controlling the welding robot according to the present invention. When numerical values are input for the various parameters set forth above in performing a teaching operation, the numerical values are temporarily stored in the RAM 3 and the CPU 1 reads in the values in accordance with the control program, after which the CPU performs calculations in accordance with the calculation sequence stored in ROM 2 and delivers a welding voltage command value to the D/A converter 6.

Next, an actual example of an input value setting and welding voltage conversion operation will be described with reference to FIG. 4. See the discussion of FIG. 1 for meaning and relationship of the scales in FIG. 4.

We will assume that the following data are entered from the operator's panel 4 when a teaching operation is carried out:

MINCOM=0
MAXCOM=500
a=40
b=420
c=200
DIGZP11=10 (this indicates that the decimal point is located between the first and second digits from the right)
DIV=100 (number of divisions of the input signal)

With the entry of these parameters, the setting of the partitioning command unit value δ is as follows:

$$\begin{aligned}
\delta &= (MAXCOM - MINCOM)/(DIGZP11 \times DIV) \\
&= (500 - 0)/(10 \times 100) \\
&= 0.5 \text{ V}
\end{aligned}$$

Further, the output conversion expression is as follows:

$$\begin{aligned}
y &= c \times (x - A/(B - A) \\
&= c \times [x - (MINCOM + a)]/(b - a) \\
&= 200 \times [x - (0 + 40)/(420 - 40) \\
&= (200/380) \times (x - 40)
\end{aligned}$$

Let the welding voltage used, which voltage is applied to the numerical control unit, be a digital commanded value of 20 V. We then have $$x = 20 \text{ V} \times DIGZP11 = 20 \times 10 = 200$$

and we obtain $$y = (200/380) \times (200 - 40) = 84.2 \text{ V}$$

Figures below the decimal are discarded. Hence, digital 84, where 84 V is represented by a corresponding digital value V is applied to the D/A converter 6.

When 84 V is applied to D/A converter 6, the analog output obtained from the output terminal of D/A converter 6 is as follows:

$$V = (84 \times 10)/200 = 4.2 \text{ V}$$

In a case where a fraction is input for the setting unit δ in applying the welding voltage to the numerical control unit, any remainder is discarded. For example, assume that 10.2 V is applied as the welding voltage when setting unit δ=0.5 V. We will then have $$10.2/\delta = 10.2/0.5 = 20 \ldots \text{ remainder: } 2$$

The remainder 2 is discarded.

The display unit displays 10 V, which follows from the fact that $$20 \times \delta = 20 \times 0.5 = 10 \text{ V}$$

Figure 5:
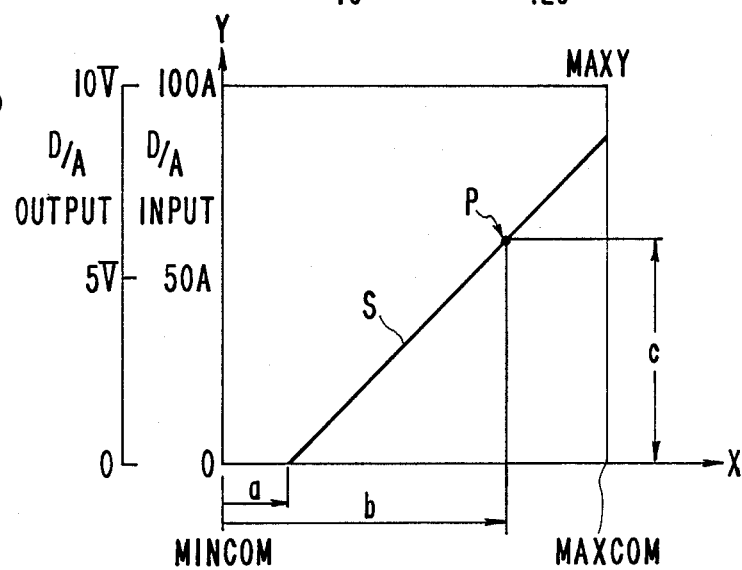
FIG. 5 is a characteristic diagram showing how an input signal to a digital/analog converter (D/A converter) is related to a range of welding currents in one operating condition of a welding robot according to the present invention.

FIG. 5 is a characteristic diagram showing how an input signal to the D/A converter 6 is related to a range of welding currents for one operating condition of the welding robot. A general expression of the straight line S shown in the characteristic diagram is stored in the ROM 2 just as in the case of the welding voltage. When the welding current condition is applied to the CPU 1 in teaching the robot, the CPU 1 substitutes the welding current condition into the general expression stored in the ROM 2, performs the calculation and obtains a welding current command value for delivery to the D/A converter 6, just as in the case of the welding voltage.

Though the present invention has been described based on the illustrated embodiment, the invention is not limited to the illustrated embodiment but can be modified in various ways without departing from the scope of the claims.

As described above, the present invention is arranged so that a numerical control unit, for controlling a robot and a welding machine, sets up a relationship between a welding condition digital input value and a digital command value delivered to a digital/analog converter that applies analog commands to the welding machine. Accordingly, the present invention is well-suited for application to a welding robot for welding operations having various welding conditions.

We claim:

1. A welding robot system for converting welding conditions of a welding robot, comprising:
   a welding robot;
   a numerical control unit, connected to said welding robot, for controlling said welding robot; and
   a welding machine connected to and controlled by said numerical control unit and equipped with a torch grasped by said welding robot,
   said numerical control unit comprising:
   processor means for processing welding decimal condition input values applied thereto and for producing a digital value as an output of the results of processing;
   a digital/analog converter for converting the digital value produced as the output by said processor means and for applying the converted digital value as a command to said welding machine; and
   a memory storing therein a calculation sequence of a general expression of a given straight line obtained from an X value of a point, where Y=0 on the given straight line, and the slope of said given straight line on a plane in which said welding condition input value being plotted along the X axis and the digital value delivered to said digital/analog converter being plotted along the Y axis, the digital value being obtained by said processor means by substituting a welding condition input value, which is applied to said processor means when the robot is taught, into the general expression stored in said memory, said processor means using the digital value obtained as the output to said digital/analog converter.

2. A system for converting the welding conditions of the welding robot according to claim 1, wherein the welding condition input value is a welding voltage.

3. A system for converting the welding conditions of the welding robot according to claim 1, wherein the welding condition input value is a welding current.

4. A universal numerical control unit for a welding machine having a welding voltage range corresponding to an input analog value range, said numerical control unit receiving a decimal commanded welding voltage having a command range, said numerical control unit comprising:
   a digital/analog converter, connected to said welding machine, having an output range matching the input analog value range, and a digital input range; and
   means, connected to the digital/analog converter, for calculating from the decimal commanded welding voltage in the command range, a corresponding digital value in the digital input range of the digital/analog converter and within the digital input range to an input analog value corresponding to commanded welding voltage, thereby and causing the commanded welding voltage to be produced by the welding machine.

* * * * *

UNITED STATES PATENT AND TRADEMARK OFFICE
CERTIFICATE OF CORRECTION

PATENT NO. : 4,835,362
DATED : MAY 30, 1989
INVENTOR(S) : SEIICHIRO NAKASHIMA ET AL.

It is certified that error appears in the above-identified patent and that said Letters Patent is hereby corrected as shown below:

FRONT PAGE [57] ABSTRACT, line 6, "(U=0)" should be

--(Y=0)--;

line 15, "adapted" should be --adopted--.

Col. 6, line 19, "84," should be --84V,--;

line 20, "value V" should be --value--.

Signed and Sealed this

Twentieth Day of February, 1990

*Attest:*

JEFFREY M. SAMUELS

*Attesting Officer*  *Acting Commissioner of Patents and Trademarks*